United States Patent [19]

Yoda et al.

[11] Patent Number: 4,615,949
[45] Date of Patent: Oct. 7, 1986

[54] MAGNETIC RECORDING MEDIUM

[75] Inventors: Kuniichi Yoda; Yuji Ishihara, both of Saku; Hitoshi Azegami, Tobu, all of Japan

[73] Assignee: TDK Corporation, Tokyo, Japan

[21] Appl. No.: 755,630

[22] Filed: Jul. 12, 1985

[30] Foreign Application Priority Data

Jul. 17, 1984 [JP] Japan ................................ 59-146731

[51] Int. Cl.$^4$ .............................................. G11B 5/70
[52] U.S. Cl. ............................... 428/425.9; 252/62.54; 360/134; 360/135; 360/136; 427/128; 428/522; 428/694; 428/900; 428/328; 428/329
[58] Field of Search ...................... 428/694, 695, 425.9, 428/328, 329, 522, 900; 427/131, 128; 252/62.54; 360/134-136

[56] References Cited

U.S. PATENT DOCUMENTS

| 3,929,659 | 12/1975 | Graham | 524/407 |
| 4,277,388 | 7/1981 | Kagami | 428/442 |
| 4,429,017 | 1/1984 | Ogawa | 428/900 |
| 4,460,653 | 7/1984 | Azegami | 428/900 |
| 4,521,486 | 6/1985 | Ninomiya | 427/131 |
| 4,529,661 | 7/1985 | Ninomiya | 427/131 |
| 4,571,364 | 2/1986 | Kasuga | 428/328 |

Primary Examiner—Ellis P. Robinson
Attorney, Agent, or Firm—Seidel, Gonda, Goldhammer & Abbott

[57] ABSTRACT

A magnetic recording medium comprises a magnetic coating material, or a dispersion of magnetic particles in a resinous binder, and a base to which the coating material is solidly applied, the resinous binder comprising as its ingredients a copolymer composed of vinyl chloride, vinylidene chloride, a vinyl alkylcarboxylate, another monomer copolymerizable with vinyl chloride, and a saponified vinyl alkylcarboxylate and having an OH/CH absorption ratio according to the infrared absorption spectrum of at least 0.2, a polyurethane resin having in its molecule a —SO$_3$M group wherein M represents an alkali metal atom, and a polyisocyanate.

10 Claims, 3 Drawing Figures

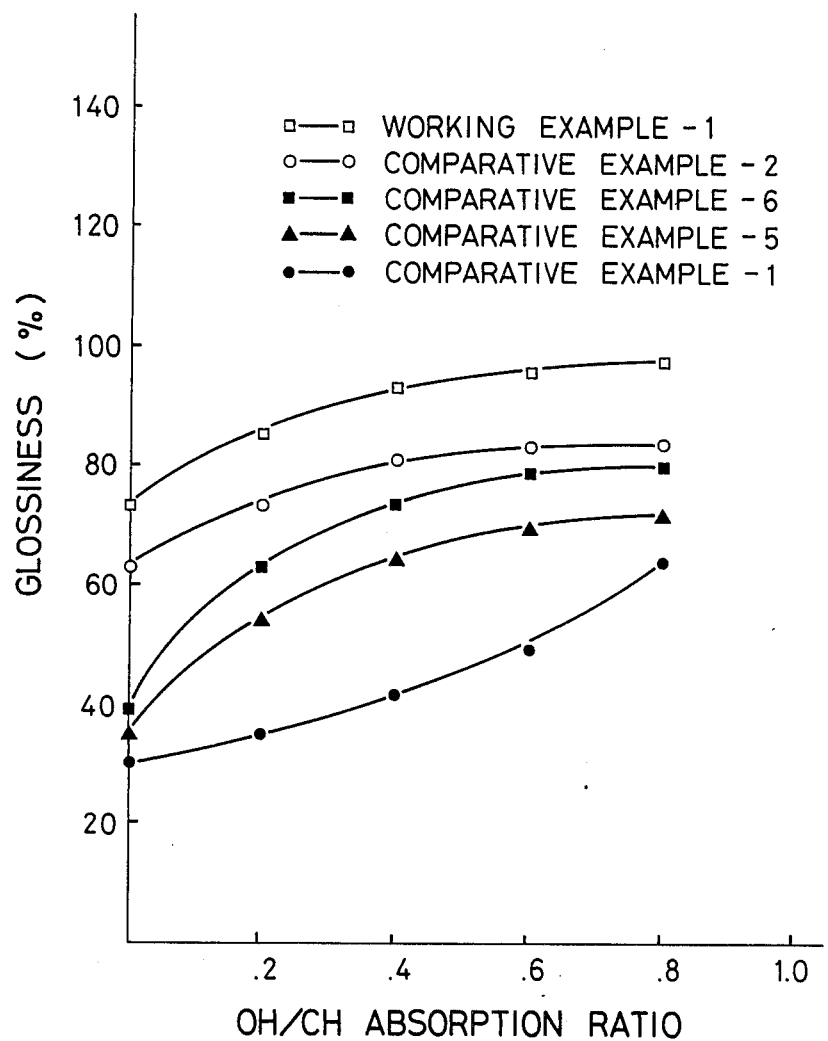

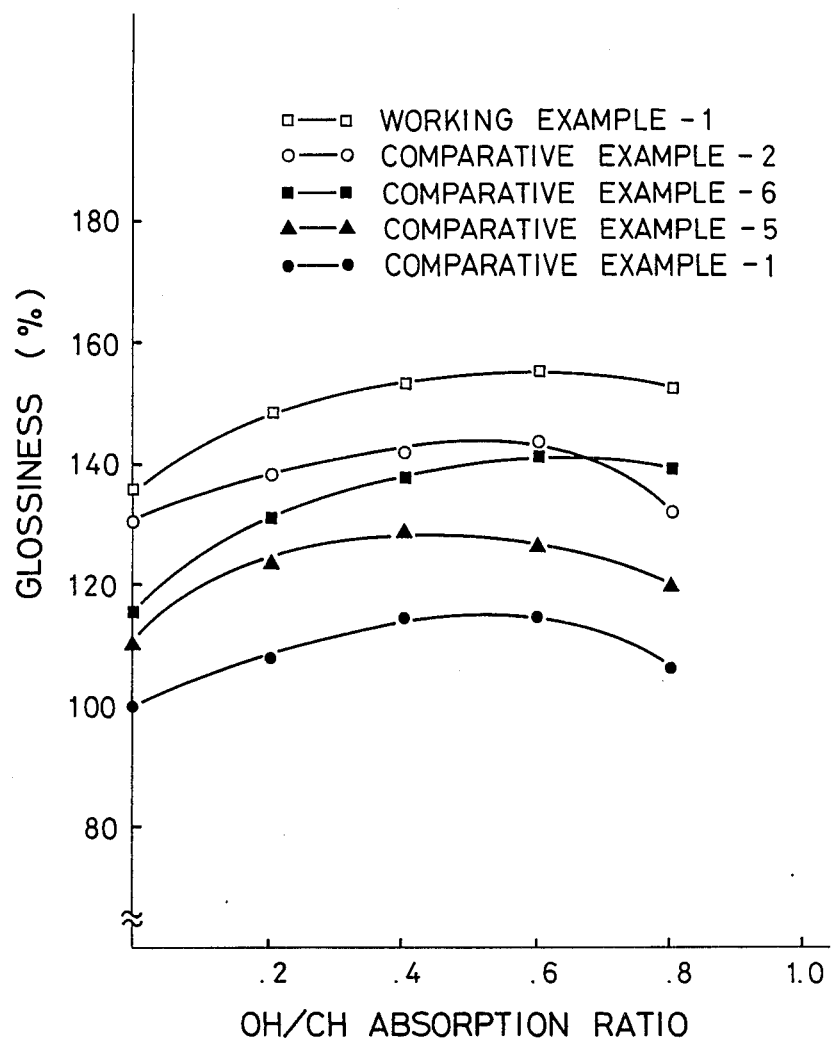

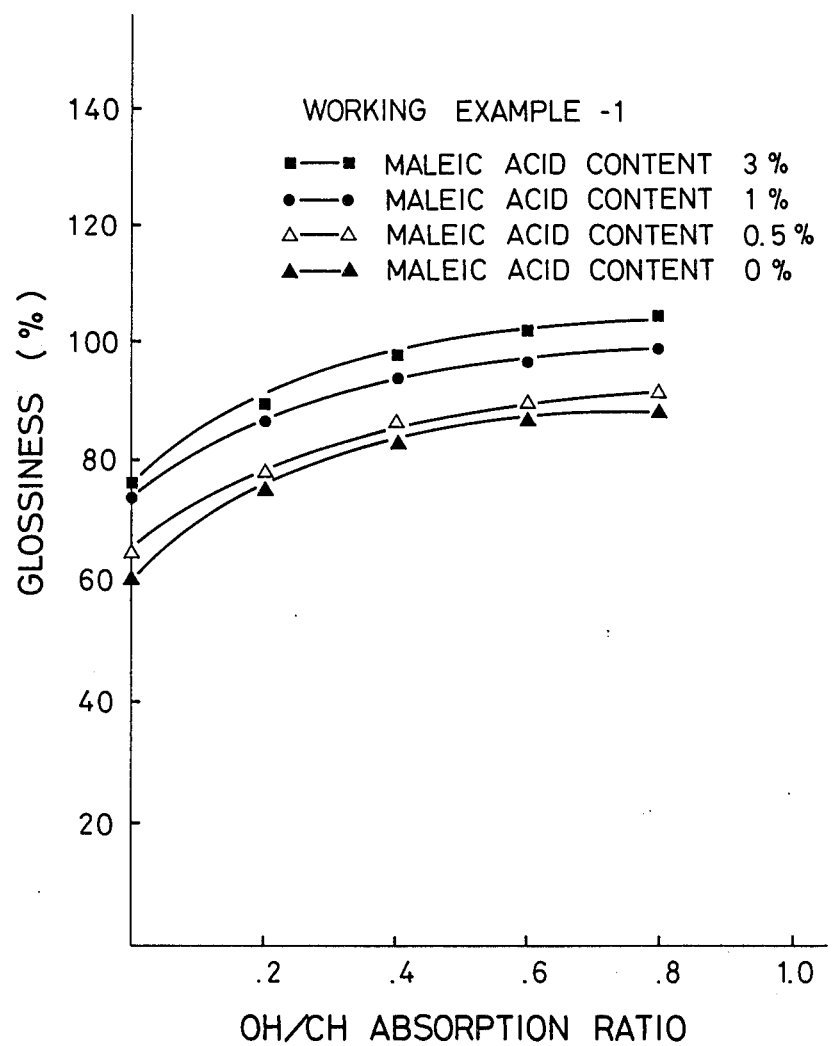

MAGNETIC RECORDING MEDIUM

BACKGROUND OF THE INVENTION

This invention relates to a magentic recording medium, and more specifically to a magnetic recording medium which exhibits good self stability and running performance in high temperature and humidity environments in addition to improved magnetic powder dispersion and surface properties of the magnetic coating film.

In general, a magnetic recording medium such as magnetic tape, etc. is made by coating a base of polyester film or the like with a magnetic coating material prepared by dispersing a magnetic powder, for example, finely divided $\gamma-Fe_2O_3$, in a high-molecular resinous binder. The properties of the magnetic coating film have much to do not only with the running performance and other physical properties of the tape but also with the magnetic powder dispersion and magnetic properties of the medium. The magnetic film properties, in turn, are largely dependent on the composition of, and the additives used in, the resinous binder. In view of these, many different resinous binder ingredients have hitherto been proposed. For instance, vinyl chloride-vinyl acetate-vinyl alcohol copolymers have been widely used as a binder resin ingredient for magnetic tapes. This type of copolymers is characterized by relatively low cost, ready solubility in solvents, good compatibility with other resins, and affinity for magnetic particles on account of the hydroxyl group in the molecule which facilitates the dispersion of the particles. Additional advantages of the copolymers are excellent magnetic properties they contribute, including high degrees of orientation and maximum residual magnetic flux density.

The recent trend toward the use of finer magnetic particles has, however, made these resins not always satisfactory. Investigations have therefore been made about increasing the proportion of hydroxyl groups in the copolymers of the foregoing type. As a result, it has already been found that the dispersibility of magnetic particles is properly improved by introducing the OH groups until the OH/CH absorption ratio according to the infrared absorption spectrum reaches 0.7 or more. However, the copolymers with increased hydroxyl group contents have such high glass transition temperatures of 70° C. or upward that they are difficult to process on the surface and hence the resulting magnetic layer after calendering can hardly be improved in surface quality.

In this connection we previously found that both the surface quality of the coating film and the glossiness of the calendered surface can be improved, without impairing the dispersibility of the magnetic powder, by mixing the vinyl chloride-vinyl acetate-vinyl alcohol copolymer as the binder ingredient with a resinous ingredient with a glass transition point lowered to 65° C. or downward (Japanese Patent Application No. 94016/1981). This time the method showed a drawback of inadequate shelf stability and running performance under high-temperature high-humidity conditions due to the lowered glass transition point. In an effort to eliminate this drawback, we then proposed to employ a copolymer composed of vinyl chloride, a vinyl alkylcarboxylate, another monomer copolymerizable with vinyl chloride, and a saponified vinyl alkylcarboxylate and having an OH/CH absorption ratio according to the infrared absorption spectrum of 0.2 to 0.7. The copolymer, with the proportion of the saponified ingredient kept rather small, is prevented from undergoing a boost in the glass transition point. Partial loss of the dispersibility of the magnetic powder due to the decrease in proportion of the saponified ingredient is made up for with the action of the monomer copolymerizable with vinyl chloride. Thus, improvements are achieved in orientation, maximum residual magnetic flux density, and other characteristics (Japanese Pat. App. No. 182254/1981, etc.).

Nevertheless, with the more recent tendency toward the adoption of even finer magnetic particles, the singular use of such a copolymer as a binder resin poses problems yet to be solved including unsatisfactory powder dispersibility, inadaquate bond strength, and questionable storability and running performance of the resulting magnetic tapes in high-temperature high-humidity environments.

In order to solve these problems, we tried to adopt a resinous binder comprising (i) a cpolymer composed of vinyl chloride, a vinyl alkylcarboxylate, another monomer copolymerizable with vinyl chloride, and a saponified vinyl alkylcarboxylate as its constituents and having an OH/CH absorption ratio according to the infrared absorption spectrum of at least 0.2, (ii) a rubbery binder ingredient, and (iii) a polyisocyanate curing agent. The resin binder was found superior to the binder consisting of the above copolymer alone in imparting the coating film with good dispersibility, ease of calendering, and in improving the shelf stability and running performance of the magnetic medium in hot and humid environments. Still, it has been observed that even such a binder of ternary resin system cannot confer fully satisfactory dispersibility on the ultrafine magnetic particles of the present day, and that the rubbery binder ingredient added to improve the physical properties, for example, the bond strength and running quality, of the coating film rather reduces the dispersibility of the magnetic particles.

With the foregoing in view, the present invention aims at providing a magnetic recording medium with notably improved dispersion of ultrafine magnetic particles in the magnetic layer.

SUMMARY OF THE INVENTION

It has been found that a magnetic recording medium having good electromagnetic conversion characteristics and high shelf stability and running performance in hot and humid environments, besides excellent magnetic powder dispersibility and improved surface quality of the coating film, can be provided by the use of a combination, as resinous binder ingredients, of (i) a copolymer composed of vinyl chloride, vinylidene chloride, a vinyl alkylcarboxylate, another monomer copolymerizable with vinyl chloride, and a saponified vinyl alkylcarboxylate as its constituents and having an OH/CH absorption ratio according to the infrared absorption spectrum of at least 0.2, (ii) a polyurethane resin having in its molecule a —$SO_3M$ group wherein M represents an alkali metal, and (iii) a polyisocyanate as a curing agent. Thus, the invention provides a magnetic recording medium which comprises a magnetic coating material, or a dispersion of magnetic particles in a resinous binder, and a base to which the coating material is solidly applied, the resinous binder comprising as its ingredients a copolymer composed of vinyl chloride, vinylidene chloride, a vinyl alkylcarboxylate, another monomer copolymerizable with vinyl chloride, and a saponified vinyl alkylcarboxylate and having an OH/CH absorption ratio according to the infrared absorption spectrum of at least 0.2, a polyurethane resin having in its molecule a —SO$_3$M group wherein M respresents an alkali metal atom, and a polyisocyanate. According to the invention, the previously proposed vinyl chloride-base copolymer further copolymerized with vinylidene chloride holds back any rise of the glass transition point, without decreasing the proportion of the saponified copolymer, thus contributing to an improvement in magnetic particle dispersibility and ease of surface processing. In addition, the incorporation of a polyurethane resin having a —SO$_3$M group in the molecule avoids the decrease in the dispersibility with the conventional use of a rubbery binder ingredient. The addition of a polyisocyanate as a curing agent further improves the physical properties of the resulting magnetic coating film.

BRIEF DESCRIPTION OF THE DRAWINGS

FIG. 1 is a graphic representation of the surface property (glossiness) of specimens of magnetic recording medium according to the invention before being calendered;

FIG. 2 is a graphic representation of the surface property (glossiness) of the specimens after calendering; and FIG. 3 is a graph showing variations in glossiness of (as-coated) specimens with different maleic acid contents in the copolymer used under the invention.

DETAILED DESCRIPTION

The vinyl alkylcarboxylate and the saponified one as constituents of the vinyl chloride-vinylidene chloride-vinyl alkylcarboxylate copolymer for use as a resinous binder ingredient under the invention may be vinyl acetate, vinyl propionate, vinyl Versatate, and their saponification products. Also, examples of the other monomers copolymerizable with vinyl chloride for use in the invention are maleic, fumaric, and methacrylic acids and their esters, and acrylic acid and its esters. On the basis of such a copolymer, the other ingredients are generally used in amounts by weight of: 50 to 85% of vinyl chloride, 5 to 40% each of vinylidene chloride and a vinyl alkylcarboxylate, 1.0 to 5.0% of the other monomer copolymerizable with vinyl chloride, and the remainder practically of a saponified vinyl alkylcarboxylate. The copolymer for use in the present invention may be prepared in a variety of ways. One method, for example, consists in saponifying a vinyl chloride-vinylidene chloride-vinyl alkylcarboxylate copolymer, and then reacting the resultant with another monomer copolymerizable with vinyl chloride. For this saponification its dispersibility-reducing effect upon the magnetic powder must be controlled to some extent and therefore the OH/CH absorption ratio according to the infrared absorption spectrum of the copolymer must be at least 0.2. In the expression OH/CH absorption ratio according to the infrared absorption spectrum as used herein, the OH absorption occurs at 3450 cm$^{-1}$ and the CH absorption at 2930 cm$^{-1}$, and the OH/CH means their intensity ratio.

The polyurethane resin having a —SO$_3$M group in the molecule will not contribute much to the improvement in dispersibility of magnetic particles of the —SO$_3$M group proportion is too small but will cure inadequately with the polyisocyanate if the proportion is excessive. Generally, a polyurethane resin in which the —SO$_3$M group proportion ranges from about 10 to 1000 g equivalent/10$^4$ g gives good result. If the proportion is less than 10 g equivalent/10$^4$ g, the resin imparts only limited dispersibility whereas a proportion of more than 1000 g equivalent 10$^4$ g will no longer allow the resin to react with the polyisocyanate as a curing agent, with unfavorable effects upon the physical properties of the resulting coating film. The amount of the —SO$_3$M-containing polyurethane resin to be used is in the range of 20 to 80% by weight, preferably 30 to 70% by weight, on the basis of the total weight of resins in the binder.

The —SO$_3$M group-containing polyurethane resin to be used in the invention is prepared by reaction of an SO$_3$M-group-containing polyhydroxy compound with a polyisocyanate. For this purpose a polyhydroxy compound in which all or part of the sulfuric group content has been converted to a metal salt is used. A polyester polyol comprising a carboxylic acid ingredient, a glycol ingredient, and a dicarboxylic acid ingredient and containing a metal salt group of sulfonic acid may also be employed. The metal salt group of sulfonic acid is contained in the carboxylic acid or dicarboxylic acid or both. Examples of dicarboxylic and carboxylic acids are terephthalic, isophthalic, orthophthalic, aromatic dicarboxylic, aromatic oxycarboxylic, succinic, adipic, azelaic, and sebacic acids. The glycol ingredient may be any of ethylene glycol, propylene glycol, 1,3-propanediol, 1,4-butanediol, 1,5-pentanediol, neopentyl glycol, diethylene glycol, 1,6-hexanediol, dipropylene glycol, 2,2,4-trimethyl-1,3-pentanediol, 1,4-cyclohexanedimethanol, ethylene oxide adduct and propylene oxide adduct of bisphenol, ethylene oxide adduct and propylene oxide adduct of hydrogenated bisphenol, polyethylene glycol, polypropylene glycol, and polytetraglycol. It may be used in combination with a trio or tetrol such as trimethylolethane, trimethylolpropane, glycerin, or pentaerythritol. The polyhydroxy compounds containing a metal salt group of sulfonic acid may be employed singly or as a mixture of two or more. Among the polyisocyanates useful in forming the polyurethane resin for the invention are 2,4-tolylene diisocyanate, 2,6-tolylene diisocyanate, p-phenylene diisocyanate, diphenylmethane diisocyanate, m-phenylene diisocyanate, hexamethylene diisocyanate, tetramethylene diisocyanate, 3,3'-dimethoxy-4,4'-biphenylene diisocyanate, 1,3-naphthalene diisocyanate, 4,4'-diphenylene diphenyl ether, p-xylylene diisocyanate, m-xylylene diisocyanate, 1,3-diisocyanato methyl cyclohexane, 1,4-diisocyanato methyl cyclohexane, 4,4'-diisocyanato dicyclohexane, 4,4'-diisocyanato dicyclohexylmethane, and isophorone diiso-cyanate. The polyurethane resin is obtained by reacting a polyhydroxy compound with a polyisocyanate in the usual manner in a solvent or without the use of any solvent. The molecular weight of such a polyurethane resin desirably ranges from 5,000 to 100,000.

Useful polyisocyanate type curing agent for the invention include bifunctional isocyanates, such as tolylene diisocyanate, diphenylmethane diisocyanate, and hexane diisocyanate, and trifunctional isocyanates. Whatever polyisocyanate usable as a curing agent may be employed. The polyisocyanate for use in the present invention is added in an amount of 5 to 30%, preferably 10 to 25%, on the basis of the total resin weight. Commercially available polyisocyanate compounds usable to this end are, for example, the products of Nippon Polyurethane Industry Co. tradenamed "Coronate L", "-HL", and "-2036".

The relative proportions of the three resinous binder ingredients to be used in preparing the magnetic coating material of the invention are as follows. Usually, on the basis of the total resin weight, the polyurethane resin accounts for 20 to 80%, the polyisocyanate curing agent for 5 to 30%, and the copolymer for the remainder, all by weight. Preferably, the polyurethane resin accounts for 30 to 70%, the polyisocyanate curing agent for 10 to 25%, and the copolymer for 70 to 30%, all by weight.

The magnetic powder to be employed does not characterize the present invention; it may be any magentic particles, for example, of $\gamma$-iron oxide, Co-containing $\gamma$-iron oxide, or ferroalloy, in common use for the manufacture of magnetic recording media.

When the binder of the afore-described composition was used in the coating layer of the magnetic recording medium according to the invention, the shortcomings inherent to conventional binders were considerably remedied and improvements were achieved in dispersibility and surface properties. Moreover, good electromagnetic conversion characteristics were attained along with desirable shelf stability and running stability of the medium in hot and humid environments.

The present invention is illustrated by the following examples and comparative examples.

COMPARATIVE EXAMPLE 1

| | |
|---|---|
| Vinyl chloride-vinyl acetate copolymer[1] (OH/CH absorption ratios = 0, 0.2, 0.4, 0.6, & 0.8) | 12-28 g |
| Polyurethane resin (—SO$_3$M group-free, tradenamed "Nippollan 5033") | 12-28 |
| Dispersant | 0-10 |
| Abrasive (alumina) | 1-10 |
| Lubricant (fatty acids) | 1-20 |
| Carbon | 6-12 |
| Polyisocyanate ("Coronate L") | 4-20 |
| Magnetic powder (Co-containing $\gamma$-Fe$_2$O$_3$) | 120-200 |

COMPARATIVE EXAMPLE 2

The same formulation as in Comparative Example 1 was used with the exeception that the polyurethane resin was replaced by a —SO$_3$M group-containing one.

COMPARATIVE EXAMPLE 3

| | |
|---|---|
| Vinyl chloride-vinyl acetate copolymer[2] (monomer (maleic acid) contents = 0, 0.5, 1.0, 2.0, & 3.0%) | 12-28 g |
| Polyester resin (tradenamed "Nippollan 4032") | 12-28 |
| Dispersant | 0-10 |
| Abrasive (alumina) | 1-10 |
| Lubricant (fatty acids) | 1-20 |
| Carbon | 6-20 |
| Polyisocyanate ("Coronate L") | 4-20 |
| Magnetic powder (Co-containing $\gamma$-Fe$_2$O$_3$) | 120-200 |

COMPARATIVE EXAMPLE 4

| | |
|---|---|
| Vinyl chloride-vinylidene chloride copolymer[3] (monomer (maleic acid) contents = 0, 0.5, 1.0, 2.0 & 3.0%) | 12-28 g |
| Polyurethane resin (—SO$_3$M group-free, tradenamed "Nippollan 2304") | 12-28 |
| Dispersant | 0-10 |
| Abrasive (alumina) | 1-10 |
| Lubricant (fatty acids) | 1-20 |
| Carbon | 6-20 |
| Polyisocyanate ("Coronate L") | 4-20 |
| Magnetic powder (Co-containing $\gamma$-Fe$_2$O$_3$) | 120-200 |

COMPARATIVE EXAMPLE 5

| | |
|---|---|
| Vinyl chloride-vinyl acetate copolymer[4] (OH/CH absorption ratios = 0, 0.2, 0.4, 0.6, & 0.8) (monomer (maleic acid) contents = 0, 0.5, 1.0, 2.0, & 3.0%) | 12-28 g |
| Polyurethane resin (—SO$_3$M group-free, tradenamed "Nippollan 2304") | 12-28 |
| Dispersant | 0-10 |
| Lubricant (fatty acids) | 1-20 |
| Abrasive | 1-10 |
| Carbon | 6-12 |
| Polyisocyanate ("Coronate L") | 4-20 |
| Magnetic powder (Co-containing $\gamma$-Fe$_2$O$_3$) | 120-200 |

COMPARATIVE EXAMPLE 6

| | |
|---|---|
| Vinyl chloride-vinylidene chloride-vinyl acetate copolymer[5] (OH/CH absorption ratios = 0, 0.2, 0.4, 0.6, & 0.8) (monomer (maleic acid) contents = 0, 0.5, 1.0, 2.0 & 3.0%) | 12-28 g |
| Polyurethane resin (tradenamed "Nippollan 2304") | 12-28 |
| Dispersant | 0-10 |
| Abrasive | 1-10 |
| Lubricant (fatty acids) | 1-20 |
| Polyisocyanate ("Coronate L") | 4-20 |
| Carbon | 6-12 |
| Magnetic powder (Co-containing $\gamma$-Fe$_2$O$_3$) | 120-200 |

EXAMPLE 1

| | |
|---|---|
| Vinyl chloride-vinylidene chloride-vinyl acetate copolymer[5] (OH/CH absorption ratios = 0, 0.2, 0.4, 0.6, & 0.8) (monomer (maleic acid) contents = 0, 0.5, 1.0, 2.0, & 3.0%) | 12-28 |
| —SO$_3$Na-containing polyurethane resin (—SO$_3$Na content = 10-1000 g equiv/× 10$^4$ g) | 12-28 |
| Dispersant | 0-10 |
| Lubricant | 1-20 |
| Abrasive | 1-10 |
| Carbon | 6-12 |
| Polyisocyanate ("Coronate L") | 4-20 |
| Magnetic powder (Co-containing $\gamma$-Fe$_2$O$_3$) | 120-200 |

EXAMPLE 2

Except for the replacement of the magnetic powder to $\gamma$-Fe$_2$O$_3$ the same formulation as given in Example 1 was used.

EXAMPLE 3.

The formulation was the same as that of Example 1 excepting that the polyurethane resin was replaced by a —SO$_3$K-containing one.

Notes:
(1) A terpolymer saponified to one of the varied absorption ratios given in the parentheses.
(2) A terpolymer containing maleic acid in one of the amounts given in the parentheses.

(3) A terpolymer containing maleic acid in one of the amounts given in the parentheses.
(4) A quaternary copolymer saponified to one of the varied absorption ratios in the parentheses and also containing a monomer in one of the amounts given in the other set of parentheses.
(5) A five-ingredient copolymer saponified to one of the varied absorption ratios in the parentheses and also containing a monomer in one of the amounts given in the other set of parentheses.

The preparation of the copolymer for use in the present invention may start with a vinyl chloride-vinylidene chloride-vinyl acetate copolymer in one of varied composition ratios. For example, the copolymer to be used in Examples of the invention may be prepared on the basis of a vinyl chloride-vinylidene chloride-vinyl acetate copolymer in a composition ratio of 80:15:5, 80:10:10, or 70:15:15 (all by weight), saponifying it to one of varied degrees and copolymerizing or not copolymerizing with one of varied amounts of another monomer.

Magnetic coating materials were made of the compositions formulated in the above Comparative Examples and Examples of the invention. Each coating material was applied to a 14 μm-thick polyester film, the coated film was processed on the surface, and, after a curing reaction at about 60° C. for 24 hours, the tape was slitted into ribbons ½ in. wide to obtain a magnetic tape. FIGS. 1 and 2 graphically represent the surface property (glossiness) values of the magnetic tapes thus obtained before and after calendering, respectively.

It is obvious from FIGS. 1 and 2 that the magnetic recording medium coated with the magnetic material containing both the vinyl chloride-vinylidene chloride-vinyl acetate copolymer[5] and the polyurethane resin having the —$SO_3M$ group in the molecule is superior to the conventional ones using ordinary resinous ingredients in the glossiness values before and after the calendering.

FIG. 3 shows changes in glossiness of the coating based on the copolymer of the invention with its maleic acid content. Coatings containing 1.0% or more maleic acid gives satisfactory gloss.

Magnetic coating materials were prepared from some compositions formulated in Comparative Examples and Example 1, and ½-in.-wide video tapes were made using these coatings. The results of characteristic tests conducted with the tapes are given in Table 1.

As can be clearly seen from Table 1, the vinyl chloride=vinylidene chloride-vinyl acetate copolymer[5] gave a magnetic tape superior to the tapes using the vinyl chloride-vinyl acetate copolymers[1],[2],[4] and the vinyl chloride-vinylidene chloride copolymer[3] in magnetic properties (including the magnetic powder dispersibility), glossiness of the calendered surface (surface properties), and also in electromagnetic conversion characteristics.

The formulation of Example 1, which used the vinyl chloride=vinylidene chloride-vinyl acetate copolymer[5], polyurethane resin having a —$SO_3M$ group in the molecule, and a polyisocyanate as resinous ingredients, improved the magentic properties of the resulting tape, glossiness of its calendered surface, and its electromagnetic conversion characteristics over the tapes incorporating the other resinous ingredients.

In the test of running durability as a measure of the physical properties of the coating film, too, the copolymer containing the saponified vinyl alkylcarboxylate showed better results. The magnetic coats that did not contain the saponified carboxylate had poor physical properties because of inadequate reaction with the polyisocyanate. Those coatings of comparative examples showed tape damages (uneven tape elongation) and formation of deposits from defective magnetic coating films onto the running system and heads of the testing VTR.

The magnetic recording medium, as described above, is characterized by excellent magnetic powder dispersibility, improved surface properties, outstanding electromagnetic conversion characteristics including S/N, and high storability and running stability in hot and humid environments.

While the present invention has been illustrated as embodied using either $\gamma$-$Fe_2O_3$ or Co-coated $\gamma$-$Fe_2O_3$ as the magnetic powder, other magnetic powders such as finely divided $Fe_3O_4$, Co-coated $Fe_3O_4$ and other alloys may be employed as well. Also, the additives (e.g., dispersant and lubricant) may include the conventionally used fatty acids (myristic, palmitic, stearic, and behenic acids), silicone oil (dimethylsiloxane), antistatic agents (metallic soaps and quaternary ammonium salts) and dispersing agents (fatty acid esters, phosphoric esters, sorbitan esters, and higher alcohols).

What is claimed is:

1. A magnetic recording medium comprising a magnetic coating material, or a dispersion of magnetic particles in a resinous binder, and a base to which the coating material is solidly applied, said resinous binder compris-ing as ingredients thereof a copolymer composed of

TABLE 1

| Sample No. | | | Magnetic characteristic Br | Br/Bm | Glossiness (%) | Y-S/N (dB) | C-S/N (dB) | ENVE. VAR | Tape durability |
|---|---|---|---|---|---|---|---|---|---|
| Comp. Ex. | | | | | | | | | |
| 1 | OH/CH abspn ratio | 0.6 | 1050 | 0.748 | 115 | −0.1 | +0.2 | 35 | O |
| 2 | " | | 1220 | 0.780 | 143 | +1.2 | +1.5 | 28 | O |
| 3 | Maleic acid cont. | 2.0% | 1050 | 0.750 | 124 | +0.1 | +0.5 | 33 | X |
| 4 | " | 1.0% | 1050 | 0.751 | 123 | +0.1 | +0.4 | 33 | X |
| 5 | OH/CH abspn ratio Maleic acid cont. | 0.6 1.0% | 1120 | 0.760 | 126 | +0.7 | +1.0 | 31 | O |
| 6 | OH/CH abspn ratio Maleic acid cont. | | 1210 | 0.775 | 142 | +1.2 | +1.5 | 29 | O |
| Example 1 | OH/CH abspn ratio Maleic acid cont. | | 1280 | 0.800 | 155 | +2.0 | +2.3 | 23 | O |

Notes:
Electromagnetic conversion characteristics were determined on the basis of the values of the standard tape manufactured by this applicant, TDK Corporation. Tape durability was evaluated in terms of the tape damage and the amounts of deposits on the tape running system, heads, etc. of the video taperecorder after 100 passes of the test tape on the VTR in an environment of 40° C. and 80% RH.

vinyl chloride, vinylidene chloride, a vinyl alkylcarboxylate, another monomer copolymerizable with vinyl chloride, and a saponified vinyl alkylcarboxylate and having an OH/CH absorption ratio according to the infrared absorption spectrum of at least 0.2, a polyurethane resin having in the molecule thereof a —SO$_3$M group wherein M represents an alkali metal atom, and a polyisocyanate.

2. A magnetic recording medium according to claim 1 wherein the vinyl alkylcarboxylate is selected from vinyl acetate, vinyl propionate and vinyl Versatate.

3. A magnetic recording medium according to claim 2 wherein the vinyl alkylcarboxylate is vinyl acetate.

4. A magnetic recording medium according to claim 1 wherein another monomer copolymerizable with vinyl chloride is selected from maleic acid, fumaric acid, acrylic acid, methacrylic acid, an ester thereof, and a combination thereof.

5. A magnetic recording medium according to claim 4 wherein another monomer copolymerizable with vinyl chloride is maleic acid.

6. A magnetic recording medium according to claim 1 wherein the SO$_3$M group of the polyurethane resin is —SO$_3$Na or —SO$_3$K.

7. A magnetic recording medium according to claim 1 wherein the proportion of the SO$_3$M group, wherein M represents an alkali metal atom, contained in the polyurethane resin is in the range of about 10 to 1000 g equivalent/$10^4$ g.

8. A magnetic recording medium according to claim 1 wherein the copolymer comprises, all by weight on the basis thereof, 50 to 85% of vinyl chloride, 5 to 40% of vinylidene chloride, 5 to 40% of a vinyl alkylcarboxylate, 1.0 to 5.0% of another monomer copolymerizable with vinyl chloride, and the remainder substantially of a saponified vinyl alkylcarboxylate.

9. A medium according to claim 1 wherein, on the basis of the total resin weight in the resinous binder, the SO$_3$M group-containing polyurethane resin is used in the amount of 20 to 80%, the polyisocyanate 5 to 30%, and the copolymer the remainder, all be weight.

10. A medium according to claim 9 wherein the SO$_3$M group-containing polyurethane resin is used in an amount of 30 to 70%, the polyisocyanate 10 to 25%, and the copolymer 70 to 30%, all by weight.

* * * * *